United States Patent
Stephens

[19]

[11] Patent Number: 5,941,691
[45] Date of Patent: Aug. 24, 1999

[54] OVERCENTER MECHANISM FOR A PRESSURE POWERED PUMP

[75] Inventor: Dean Jeffrey Stephens, Cheltenham, United Kingdom

[73] Assignee: Spirax-Sarco, Limited, United Kingdom

[21] Appl. No.: 08/581,218

[22] Filed: Dec. 29, 1995

[30] Foreign Application Priority Data

Jul. 3, 1995 [GB] United Kingdom .................... 9513528

[51] Int. Cl.⁶ ...................................................... F04F 1/06
[52] U.S. Cl. .......................... 417/133; 417/131; 417/134
[58] Field of Search ................................. 417/131, 133, 417/134; 137/418, 422

[56] References Cited

U.S. PATENT DOCUMENTS

| | | | |
|---|---|---|---|
| Re. 34,957 | 5/1995 | Francart, Jr. ............................. | 417/133 |
| 1,285,256 | 11/1918 | Lewis . | |
| 1,406,157 | 2/1922 | Coulombe . | |
| 1,446,902 | 2/1923 | Jacobsen . | |
| 1,530,218 | 3/1925 | Stuber . | |
| 1,549,566 | 8/1925 | Bain ....................................... | 137/418 |
| 1,561,159 | 11/1925 | Hurst . | |
| 1,635,692 | 7/1927 | Schweisthal ............................ | 417/133 |
| 1,699,464 | 1/1929 | Dutcher . | |
| 1,712,985 | 5/1929 | Ellberg et al. . | |
| 2,172,110 | 9/1939 | Sabin . | |
| 2,394,169 | 2/1946 | Gray et al. . | |
| 2,558,471 | 6/1951 | Whitlock, Jr. . | |
| 2,818,819 | 7/1958 | Heard ..................................... | 417/131 |
| 3,242,873 | 3/1966 | Smith . | |
| 4,757,837 | 7/1988 | Provost et al. . | |
| 5,004,405 | 4/1991 | Breslin . | |
| 5,141,405 | 8/1992 | Francart, Jr. . | |
| 5,230,361 | 7/1993 | Carr et al. .............................. | 137/416 |
| 5,358,038 | 10/1994 | Edwards et al. ....................... | 417/131 |
| 5,366,349 | 11/1994 | Ilg . | |
| 5,426,990 | 6/1995 | Francart, Jr. ........................... | 137/445 |

FOREIGN PATENT DOCUMENTS

| | | | |
|---|---|---|---|
| 0 555 712 A2 | 8/1993 | European Pat. Off. .............. | 417/133 |
| 511728 | 8/1939 | United Kingdom . | |
| 708301 | 5/1954 | United Kingdom . | |
| 779367 | 7/1957 | United Kingdom . | |

*Primary Examiner*—Timothy S. Thorpe
*Assistant Examiner*—Cheryl J. Tyler
*Attorney, Agent, or Firm*—McDermott, Will & Emery

[57] ABSTRACT

A pressure powered pump has valve members 18, 20 operated by a float acting through an overcenter mechanism 24. The overcenter mechanism has a valve actuating lever 36, on which are provided actuating pins 46, 48 for engagement with the respective valve members 18, 20. When the valves are closed, there is a substantial clearance a between the actuating pins 46, 48 and the respective valve member or its stem 50. This causes the actuating pin 46, 48 to apply an impact to the-valve member 18, 20, so assisting its opening movement. Stops 58, 60 are provided to arrest the valve actuating member 36 at its stable end position, so avoiding high impacts being applied to the valve members 18, 20 when they close.

16 Claims, 3 Drawing Sheets

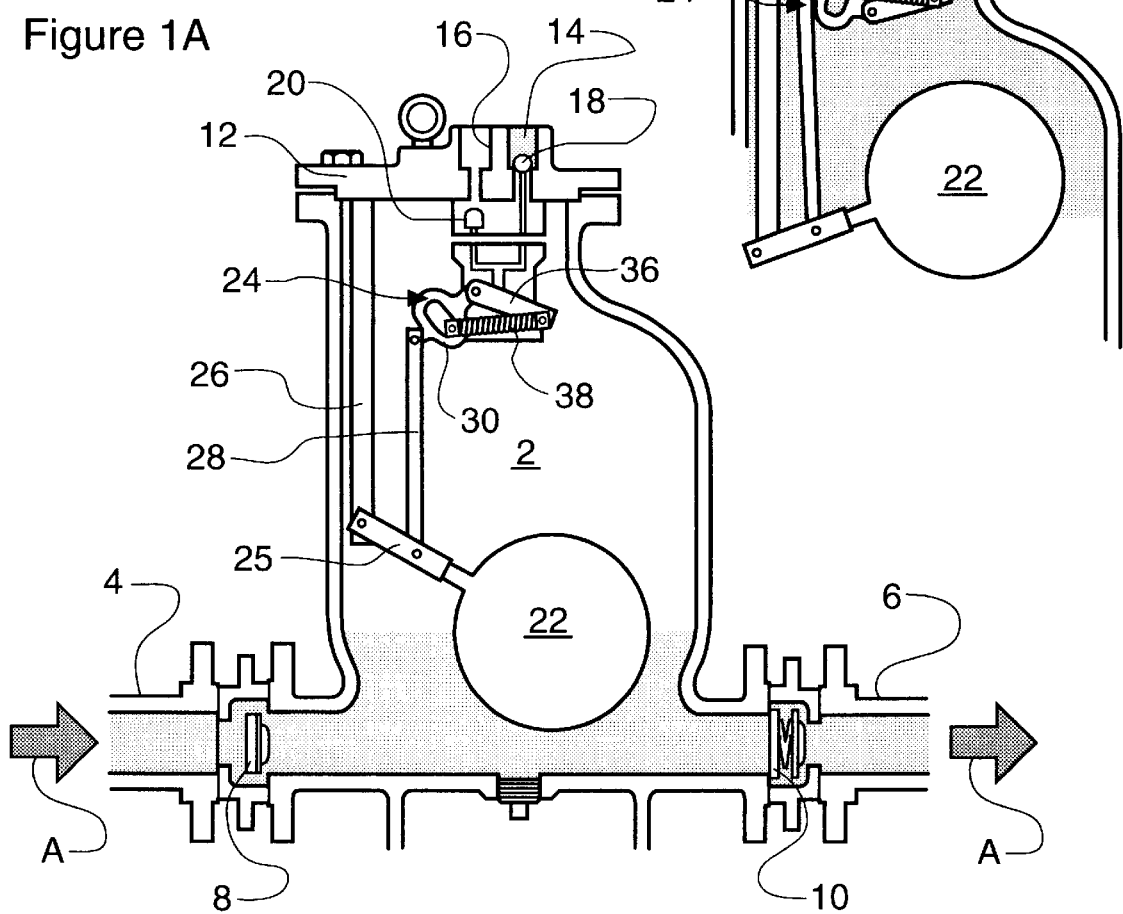
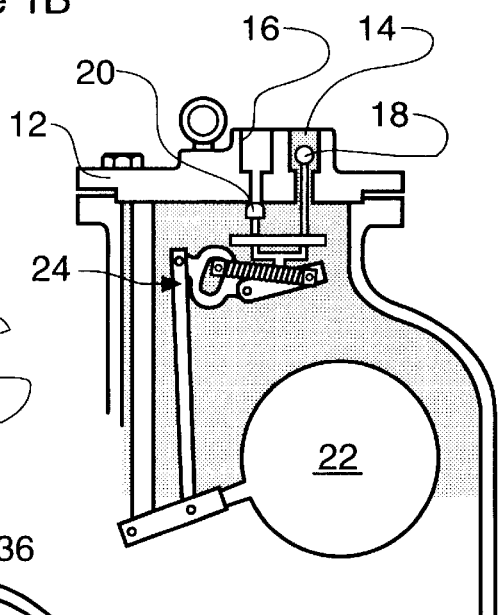
Figure 1A
Figure 1B

OVERCENTER MECHANISM FOR A PRESSURE POWERED PUMP

BACKGROUND OF THE INVENTION

This invention relates to pressure powered pumps.

Pressure powered pumps are known in which the flow of a liquid into and out of a pumping chamber is controlled by check valves, and in which the pumping action is achieved by the controlled admission of a gas under pressure, such as steam or compressed air, into the pumping chamber. The admission of the compressed gas, and its subsequent venting, is controlled by a float within the pumping chamber which acts on inlet and exhaust valves through a spring-loaded overcenter mechanism. The overcenter mechanism includes valve actuating means which operates the valves. As is common in valve operating linkages, there is a clearance in the linkage when the valves are closed so that the valves can engage the valve seats properly without obstruction from other parts of the linkage.

In the past, such clearances have been kept to a minimum in pressure powered pumps, so as to avoid lost motion in the valve operating linkages.

In a pressure operating pump, the inlet valve, when closed, is held in the closed position by the pressure difference between the compressed gas (such as steam) and the interior of the pumping chamber. Consequently, substantial force is required to open the inlet valve, this force being provided by the spring of the overcenter mechanism.

The pumping rate of a pressure powered pump is significantly affected by the sizes of the inlet and exhaust valves. To achieve a high pumping rate, large valves are required, but their sizes are limited by the force which can be applied to them by the operating mechanism comprising the float and the overcenter mechanism.

SUMMARY OF THE INVENTION

According to the present invention, there is provided a pressure powered pump, comprising a pressure chamber having an inlet and an outlet for liquid to be pumped, and having an inlet valve and an exhaust valve for a fluid under pressure, the inlet valve and the exhaust valve each comprising a valve seat and a valve member which is displaceable into and out of sealing contact with the valve seat, the valve members being controlled by a float disposed within the pressure chamber, the float being operatively connected to a spring-loaded overcenter mechanism including valve actuating means which acts on the valve members and which is movable between a first stable position, in which the inlet valve is open and the exhaust valve is closed, and a second stable position, in which the inlet valve is closed and the exhaust valve is open, the valve actuating means having contact faces which engage the respective valve members to displace the valve members from the closed position to the open position, at least one of the contact faces being substantially spaced apart from the respective valve member when that valve member is in the closed position and the valve actuating member is in the respective stable position.

By "substantially spaced apart" is meant a spacing sufficient to allow the valve actuating means to accelerate, when moving from the stable position corresponding to the closed position of the valve member, to a velocity at which the kinetic energy of the valve actuating means provides a significant contribution to the force applied to the valve member in the opening direction when the contact face on the valve actuating means hits the valve member.

Preferably, the kinetic energy of the valve actuating means at the moment of contact between the contact face and the respective valve member is greater than 25% of the total potential energy released by the spring or springs of the overcenter mechanism as the valve actuating member moves from an equilibrium position between the two stable positions to the other stable position corresponding to the open position of the respective valve member. More preferably, the kinetic energy at the moment of contact is greater than 50% of that total potential energy.

Seen from a different aspect, the spacing between the contact face and the respective valve member in the said respective stable position is greater than 25%, and more preferably greater than 45%, of the total displacement of the contact face on the valve actuating means as the valve actuating means moves between the two stable positions. In a preferred embodiment, this spacing is adjustable. In a pressure powered pump in accordance with the present invention, the spacing between the contact face and the respective valve member may be 4 millimetres and the total travel of the contact face may be 8.5 millimetres.

Preferably, the substantial spacing is provided between the valve member of the inlet valve and the respective contact face of the valve actuating means. In a preferred embodiment, the substantial spacing is provided between the valve members of both the inlet valve and the exhaust valve and the respective contact faces.

For at least one of the inlet and exhaust valves, the opening movement of the valve element may take place in the direction from the respective contact face towards the valve seat. In such a case, the valve member may have an elongate valve stem, and the contact face on the valve member may be an end face of the valve stem.

The opening movement of the other valve (for example the exhaust valve) may take place in the direction from the respective valve seat towards the contact face. The contact face on the valve actuating means may then be provided on an actuating element which extends through a slot in the valve member, and engages one end of the slot when opening the valve. The valve member may be biased by a spring in the direction to engage the contact face of the actuating element with the contact face at the end of the slot.

Stops may be provided for arresting the valve actuating means in the two stable positions, and in another aspect of the present invention, the stops are provided independently of the valve elements. In a preferred embodiment, the valve actuating means is mounted on a support for movement between the two stable positions, and the stops are provided on the support.

According to another aspect of the present invention, there is provided a pressure powered pump comprising a pressure chamber having an inlet and an outlet for liquid to be pumped and having an inlet valve and an exhaust valve for a fluid under pressure, the inlet valve and the exhaust valve each comprising a valve seat and a valve member which is displaceable into and out of sealing contact with the valve seat, the valve members being controlled by a float disposed within the pressure chamber, the float being operatively connected to a spring-loaded overcenter mechanism including valve actuating means which acts on the valve members and which is movable between a first stable position, in which the inlet valve is open and the exhaust valve is closed, and a second stable position, in which the inlet valve is closed and the exhaust valve is open, the valve actuating means being mounted for displacement between the first and second stable positions on a support which is provided with stops for arresting movement of the valve actuating means at the first and second stable positions.

BRIEF DESCRIPTION OF THE DRAWINGS

FIGS. 1A and 1B show a pressure powered pump in two different operative conditions;

DESCRIPTION OF PREFERRED EMBODIMENT

Figure 2:
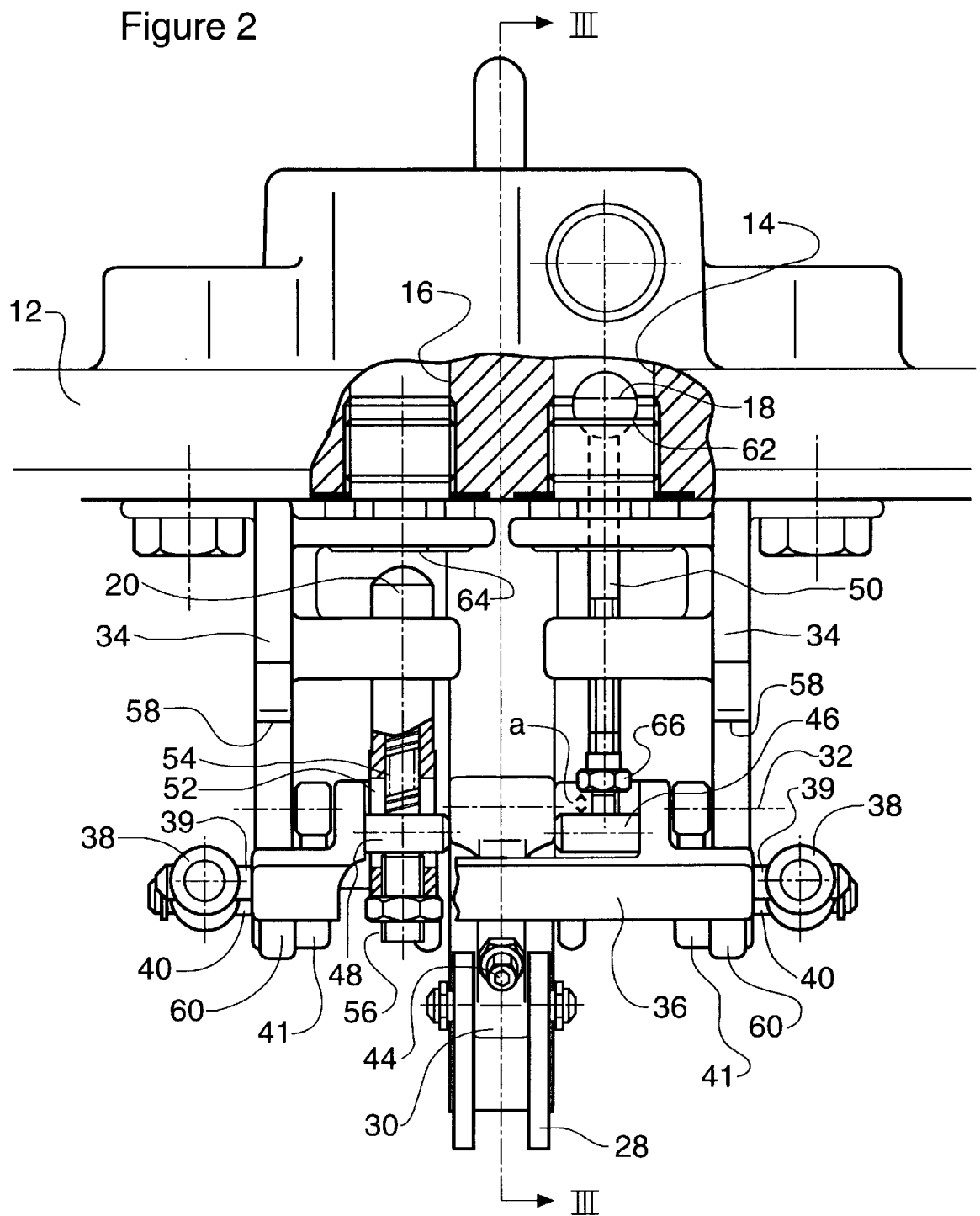
FIG. 2 is a view, on an enlarged scale, of part of a valve operating linkage of the pump of FIGS. 1A and 1B.

The pump shown in the Figures is a condensate pump for returning condensate in a steam system to the boiler.

The pump comprises a pumping chamber 2 having a condensate inlet 4 and a condensate outlet 6. Check valves 8 and 10 ensure one-way flow through the pumping chamber 2 in the direction of the arrows A.

The chamber 2 has a cap 12 which has a steam inlet passage 14 and an exhaust passage 16 which can be closed by an inlet valve member 18 and an exhaust valve member 20 respectively. The valve members 18 and 20 are operated by a float 22, acting through an overcenter mechanism 24. In operation, starting from the position shown in FIG. 1A, the steam inlet passage 14 is closed and the exhaust passage 16 is open. Condensate, under a relatively low pressure, can enter the pumping chamber 2 through the inlet 4 past the check valve 8. This causes the float 22 to rise and, when it reaches a high level, the overcenter mechanism 24 will snap over from the stable position shown in FIG. 1A to the opposite position shown in FIG. 1B. This will cause the valve members 18 and 20, which are operated in unison, to move upwards, so that the steam inlet passage 14 is opened and the exhaust passage 16 is closed. Steam under pressure can then enter the pumping chamber 2 to discharge the accumulated condensate past the check valve 10 and through the outlet 6. The float 22 accordingly falls, the overcenter mechanism 24 snaps back to the position shown in FIG. 1A, and the sequence begins again.

The float 22 has a float arm 25 by which the float is pivotably supported on a support bracket 26 projecting downwardly from the cap 12. The float arm 25 is pivotably connected by a link 28 to a slotted link 30 of the overcenter mechanism 24. The slotted link 30 is pivotably mounted on a rocker shaft 32 carried by brackets 34 which are secured to the cap 12. Valve actuating means in the form of a lever 36 is also pivotable about the rocker shaft 32, independently of the slotted lever 30. As shown more clearly in FIGS. 2 and 3, a pair of tension springs 38 extend between a pair of spigots 39 on the lever 36 and a spindle 40 which is movable within the slot 42 of the link 30. The spindle 40 is carried by a pair of levers 41 which are pivotable about the rocker shaft 32. Adjustment screws 44 are provided at each end of the slot 42.

The valve actuating lever 36 carries two actuating pins 46 and 48. The actuating pin 46 is positioned for engagement with a valve stem 50 of the valve element 18, and the actuating pin 48 is received in a slot 52 of the valve member 20. A spring 54 received in a bore formed in the valve member 20 biases the valve member 20 relatively to the actuating pin 48 so as to maintain engagement between the lower face of the actuating pin 48, constituting a contact face, and an adjustment screw 56.

Figure 3:
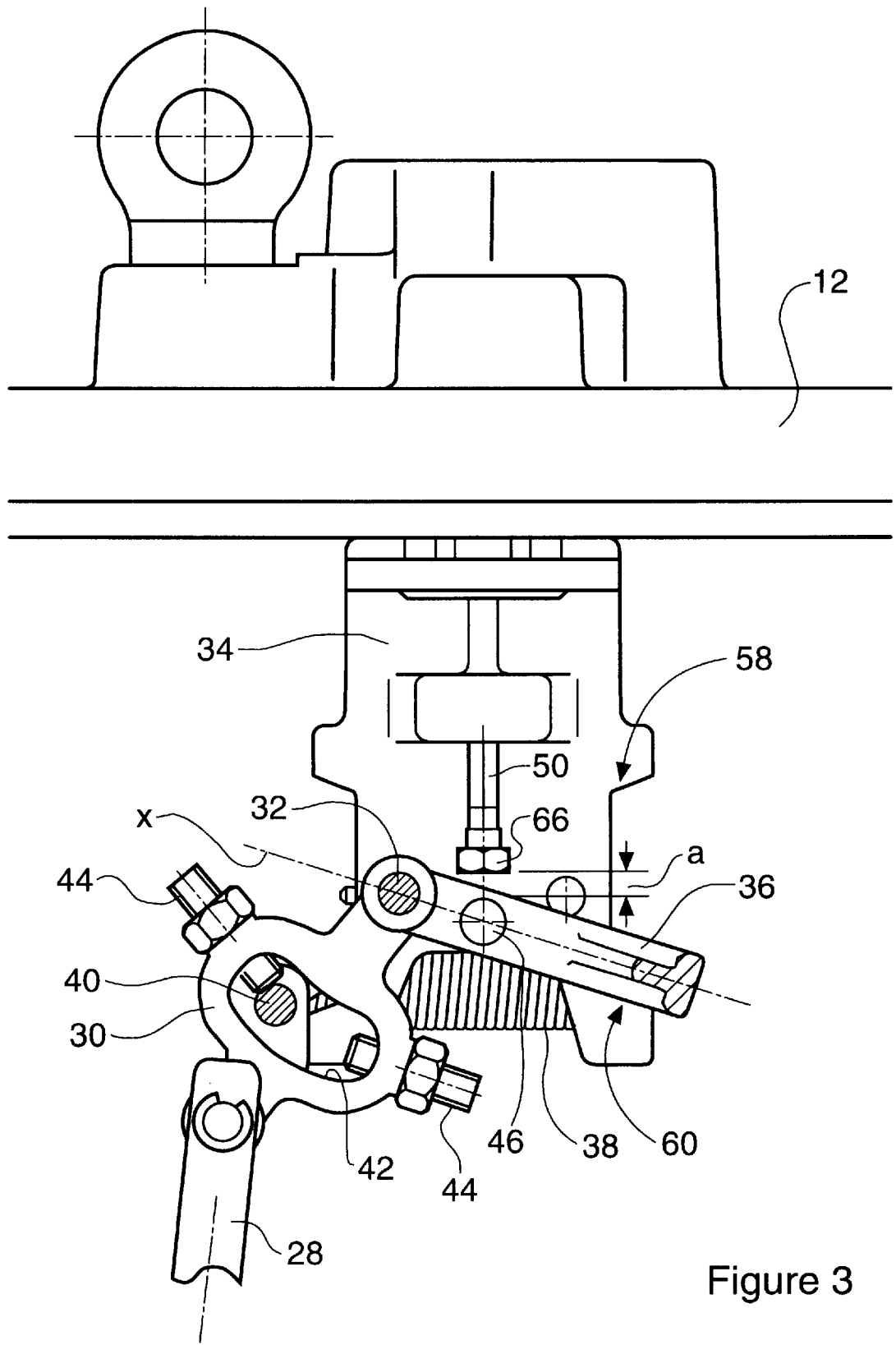
FIG. 3 is a sectional view taken along the line III—III in FIG. 2.

As shown in FIGS. 2 and 3, there is a clearance a between the actuating pin 46 and the end of a valve stem 50 of the valve member 18. A similar clearance (not shown) exists between the actuating pin 48 and the adjustment screw 56 when the valve member 20 is closed.

Upper stops 58 and lower stops 60 are provided on the brackets 34, positioned for engagement by the valve actuating lever 36.

Valve seats 62 and 64 are provided for engagement by the valve members 18 and 20 respectively.

In the position shown in FIGS. 2 and 3, the valve member 18 is in sealing contact with its seat 62, while the valve member 20 is lowered by the actuating pin 48 from its seat 64. Consequently, the condensate pump is in the condition shown in FIG. 1A and the pumping chamber 2 can fill with condensate. Air or steam within the pumping chamber 2 is vented through the exhaust passage 16.

As the level of condensate in the pumping chamber 2 rises, the slotted link 30 will turn about the rocker shaft 32 in a clockwise direction as seen in FIG. 3. Eventually, this will cause the right-hand adjustment screw 44 (as seen in FIG. 3) to engage the spindle 40, following which further turning of the slotted link 30 will carry with it the spindle 40, so extending the springs 38. The tension applied by the springs 38 to the valve actuating lever 36 will be resisted by the stops 60.

Eventually, the spindle 40 will cross the notional plane X which contains the axis of the rocker shaft 32 and the axes of the spigots 39 which connect the springs 38 to the valve actuating lever 36. When this happens, the springs 38, instead of biasing the valve actuating lever 36 in a clockwise direction, as seen in FIG. 3, will cause the valve actuating lever 36 to turn rapidly in the counter-clockwise direction. As the clearance a is taken up, the valve actuating lever 36 will gain kinetic energy which will result in the valve stem 50 being struck by the actuating pin 46 with a significant force, so assisting the remaining potential energy in the springs 38 in lifting the valve member 18 off the seat 62 against the pressure of the steam in the upper part of the passage 14.

The same movement of the valve actuating lever 36 will cause the actuating pin 48 to rise, so lifting the valve member 20, through the spring 54, into sealing contact with the seat 64 to close the exhaust passage 16. At the end of its stroke, the valve actuating lever 36 engages the stops 58, and the valve member 20 will be retained against the seat 64 by the force of the spring 54. In this condition, the lower face of the pin 48 will be lifted above the end of the adjustment screw 56, so leaving a clearance corresponding to the clearance a shown between the upper face of the pin 46 and the lower end of the stem 50.

As the float falls, it will eventually cause the slotted link 30 to turn the spindle 40 in the opposite direction, eventually causing the valve actuating lever 36 to return to the position shown in FIG. 3. This will cause the actuating pin 48 to strike the adjusting pin 56 to move the valve member 20 away from the seat 64. Also, the corresponding downwards movement of the actuating pin 46 will allow the valve member 18 to return into sealing contact with the valve seat 62.

The adjusting screw 56 and a corresponding adjusting screw 66 on the lower end of the valve stem 50 enable the clearance between the valve members 18 and 20 and the actuating pins 46 and 48 to be adjusted to provide the optimum opening force on the valve members 18 and 20 as the valve actuating lever 36 moves between its two stable end positions defined by the stops 58 and 60. By arresting the valve actuating lever 36 against the stops 58 and 60, the valve members 18 and 20, when closed against their respective valve seats 62 and 64 are not subjected to the force applied by the springs 38. As a result, the valve members 18 and 20 and the valve seats 62 and 64 do not suffer high impact forces when closing, and consequently wear in the seating surfaces can be reduced.

I claim:

1. A pressure powered pump, comprising:

a pressure chamber having an inlet and an outlet for liquid to be pumped;

an inlet valve and an exhaust valve for respectively controlling the flow of a fluid under pressure into and out of the pressure chamber, the inlet valve and the exhaust valve each comprising a valve seat and a valve member which is displaceable into and out of sealing contact with the valve seat, a spring-loaded overcenter mechanism including spring means and valve actuating means which acts directly on the valve members to displace the valves in opposite directions to each other out of sealing contact with the respective valve seats, the valve actuating means being moveable between a first stable position, in which the inlet valve is open and the exhaust valve is closed, and a second stable position, in which the inlet valve is closed and the exhaust valve is open, and a float disposed within the pressure chamber and operatively connected to the spring-loaded overcenter mechanism whereby the spring loaded overcenter mechanism is moved between the first and second stable positions in dependence upon the level of the liquid in the pressure chamber, the valve actuating means having contact faces which engage the respective valve members to displace the valve members from the closed position to the open position, both of the contact faces being substantially spaced apart from the respective valve member when that valve member is in the closed position and the valve actuating means is in the respective stable position.

2. A pressure powered pump as claimed in claim 1, in which the substantial spacing between the contact face and the respective valve member is such that, at the point of contact between the contact face and the respective valve member, the kinetic energy of the valve actuating means is at least 25% of the total potential energy releasable from the spring means of the overcenter mechanism between the equilibrium position of the overcenter mechanism and the stable position corresponding to opening of the respective valve.

3. A pressure powered pump as claimed in claim 2, in which the substantial spacing is such that the kinetic energy of the valve actuating means at the moment of contact between the contact face and the respective valve member is at least 50% of the total potential energy releasable by the spring means.

4. A pressure powered pump as claimed in any one of the preceding claims, in which the substantial spacing between the contact face and the respective valve member is at least 25% of the total displacement of the contact face of the valve actuating means during displacement of the valve actuating means between the stable positions.

5. A pressure powered pump as claimed in claim 4, in which the substantial spacing is at least 45% of the said total displacement.

6. A pressure powered pump as claimed in claim 1, in which the substantial spacing between the contact faces and the respective valve member is adjustable.

7. A pressure powered pump as claimed in claim 1, in which the substantial spacing is provided between the valve member of the inlet valve member and the respective contact face.

8. A pressure powered pump as claimed in claim 7, in which the substantial spacing is provided between the valve members of both the inlet and exhaust valves and the respective contact faces.

9. A pressure powered pump as claimed in claim 1, in which closing of the substantial spacing occurs as the respective contact face moves in the direction towards the valve seat of the respective valve.

10. A pressure powered pump as claimed in claim 1, in which closing of the substantial spacing occurs as the respective contact face moves in the direction away from the valve seat of the respective valve.

11. A pressure powered pump as claimed in claim 10, in which the valve member is provided with a slot into which extends a contact element provided with the contact face.

12. A pressure powered pump as claimed in claim 11, in which a spring acts between the valve member and the contact element to bias the contact faces towards each other.

13. A pressure powered pump as claimed in claim 1, in which stops are provided for arresting movement of the valve actuating means in the stable positions, independently of the valve members.

14. A pressure powered pump as claimed in claim 13, in which the valve actuating means is mounted for movement on a support, the stops being provided on the support.

15. A pressure powered pump, comprising:

a pressure chamber having an inlet and an outlet for liquid to be pumped;

an inlet valve and an exhaust valve for respectively controlling the flow of a fluid under pressure into and out of the pressure chamber, the inlet valve and the exhaust valve each comprising a valve seat and a valve member which is displaceable into and out of sealing contact with the valve seat;

a spring-loaded overcenter mechanism including valve actuating means which acts directly on the valve members to displace the valves in opposite directions to each other out of sealing contact with the respective valve seats, the valve actuating means being moveable between a first stable position, in which the inlet valve is open and the exhaust valve is closed, a second stable position, in which the inlet valve is closed and the exhaust valve is open, a float disposed with the pressure chamber and operatively connected to the spring-loaded overcenter mechanism whereby the spring-loaded overcenter mechanism is moved between the first and second stable positions in dependence upon the level of liquid in the pressure chamber, and, stops for arresting the movement of the valve actuating means at the first and second stable positions, independently of the valve members.

16. A pressure powered pump as claimed in claim 15, in which the valve actuating member is mounted for movement on a support, the stops being provided on the support.

\* \* \* \* \*